Sept. 5, 1933. C. H. VOGT 1,925,157
METHOD OF AND APPARATUS FOR FORMING SAUSAGES
Filed March 4, 1927 2 Sheets-Sheet 1
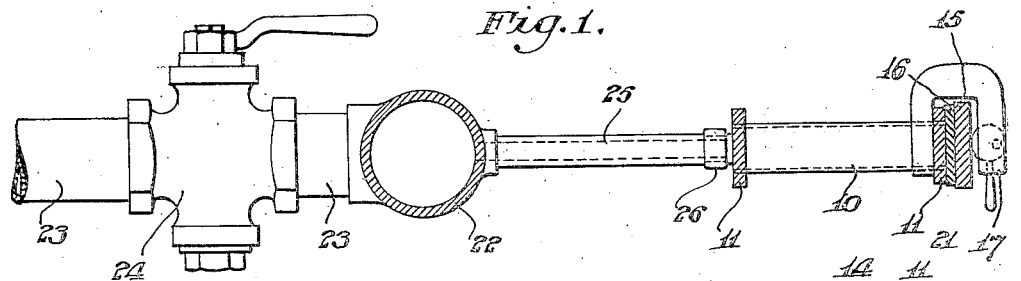
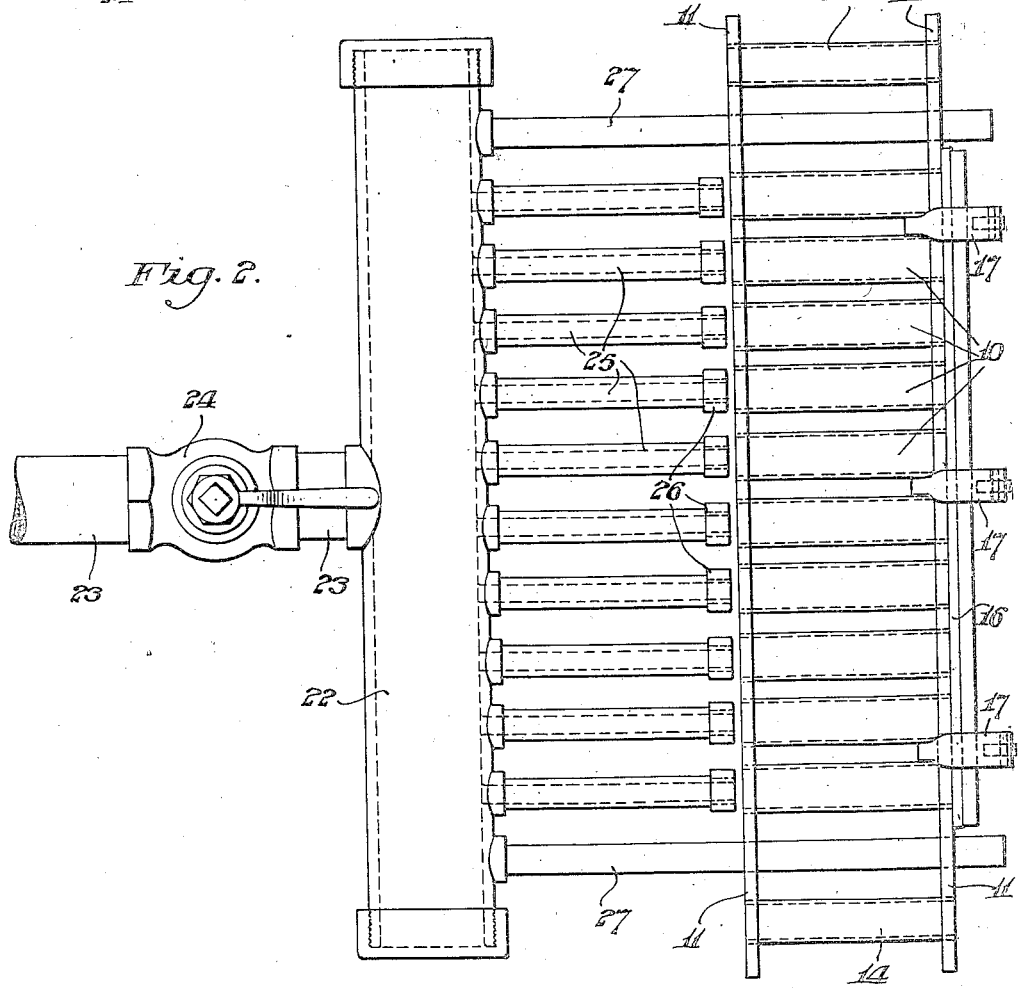
Inventor:
Charles H. Vogt,
By Jas C. Wobensmith
Attorney.

Sept. 5, 1933.  C. H. VOGT  1,925,157
METHOD OF AND APPARATUS FOR FORMING SAUSAGES
Filed March 4, 1927  2 Sheets-Sheet 2
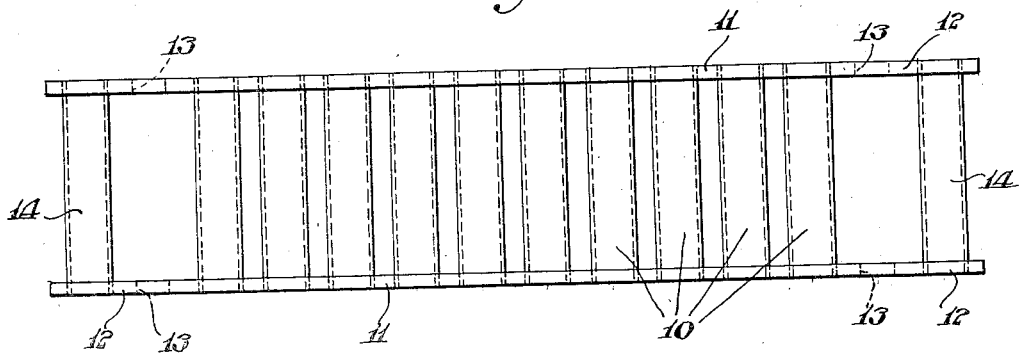
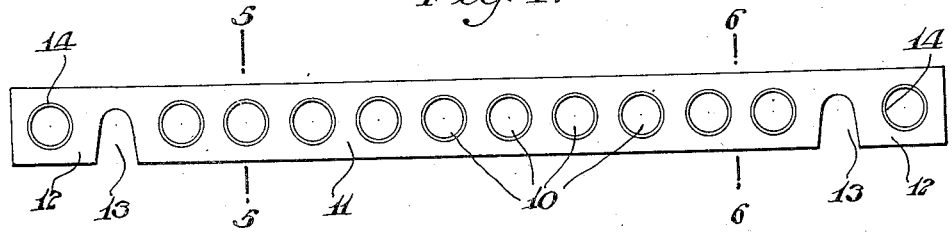
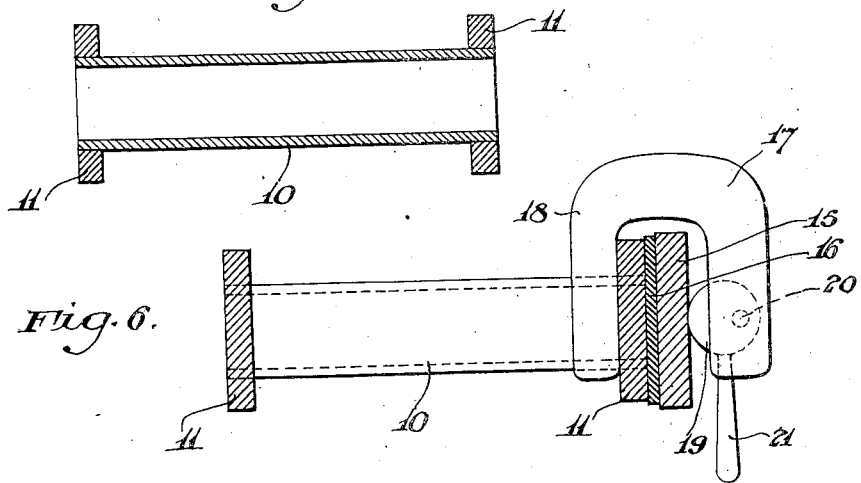
Inventor:
Charles H. Vogt,
By Jas. C. Wobensmith
Attorney.

Patented Sept. 5, 1933

1,925,157

UNITED STATES PATENT OFFICE 1,925,157

METHOD OF AND APPARATUS FOR FORMING SAUSAGES

Charles H. Vogt, Philadelphia, Pa., assignor of one-third to Frederick A. Vogt and one-third to Gustav L. Vogt Application March 4, 1927. Serial No. 172,612

11 Claims. (Cl. 17—32)

My invention relates to a method of and apparatus for forming sausages of the casingless type, and it relates more particularly to apparatus for filling the molds in which the sausage meat is shaped, to the molds themselves, and to the method employed in the filling operation.

In the manufacture of casingless sausages, one of the principal difficulties encountered is in filling the molds properly and expeditiously whereby the formed sausages will be homogeneous in texture, and whereby the same may be economically produced.

The principal object of my present invention is to provide an improved method of and apparatus for filling molds with sausage meat for the purpose of making sausages, particularly of the casingless type, which will result in the formation of such sausages of a uniform texture throughout, and which will permit the same to be produced in an economical manner. A further object of my invention is to provide a novel form of mold in which the sausage meat is shaped and processed while contained therein.

The nature and characteristic features of my invention will be more readily understood from the following description, taken in connection with the accompanying drawings forming part hereof, in which:

Figure 1 is a transverse sectional view of apparatus embodying the main features of my present invention, and for carrying out the method thereof;

Fig. 2 is a top or plan view thereof;

Fig. 3 is a top or plan view of one of the molds, detached;

Fig. 4 is a side elevation thereof;

Fig. 5 is a transverse section of one of the molds, the section being taken approximately on the line 5—5 of Fig. 4, but enlarged with respect thereto; and Fig. 6 is a similar transverse section of one of the molds, the section being taken approximately on the line 6—6 of Fig. 4, means being shown associated therewith for closing one end of each of the mold chambers.

Referring to the drawings, in the particular embodiment of my invention therein shown, the mold is shown in detached detail in Figs. 3 to 6 of the drawings, the same comprising a plurality of tubes 10 arranged in spaced parallel relationship. The tubes 10 are mounted at each end in bars 11, the ends of the tubes being secured in the bars 11 in any preferred manner, preferably by forced fits.

The ends of the bars 11 extend beyond the group of tubes mounted therein, and in each end of each bar 11 there may be provided a recess 13, for a purpose to be presently explained. The extending portions 12 of the bars 11 may also be provided with handles 14, which may comprise tubes similar to the mold tubes and secured to the bars 11 in similar manner.

For the purpose of closing the ends of the mold tubes 10, there is provided a bar 15, which is provided on one side with a rubber facing 16. The bar 15 is of such length as to extend along the mold bar 11 a sufficient distance to enable all of the mold tubes to be closed at one end by the bar 15 with the rubber facing 16.

A plurality of clamps 17 may be provided for securing the closure bar 15 in position on the molds. These clamps 17 may each comprise a C frame 18, one arm of which is adapted to be positioned between adjacent mold tubes and bear against the inner face of the mold bar 11. The other arm of the clamp frame 18 extends on the outer side of the closure bar 15, and is provided with an eccentric clamping member 19, pivoted as at 20, and provided with an operating handle 21, the arrangement being such that when the handle 21 is manipulated the closure bar 15 will be securely held against the side of the mold bar 11 and thereby close one end of each of the mold tubes 10.

For the purpose of supplying sausage meat to the molds, there is provided a manifold 22, which is connected by means of piping 23 to the cylinder of a sausage stuffer (not shown) of the ordinary type, such as is commonly used for stuffing sausage casings. A stop cock 24 is interposed in the piping 23 for the purpose of controlling the flow of sausage meat to the manifold 22. Extending from the manifold 22 is a series of parallel nozzles 25, one of these nozzles being provided for each mold tube and consequently being complementally spaced. The nozzles 25 may each be provided on the projecting end with a rubber sleeve 26.

Supporting rods 27 extend from the manifold 22 parallel to the nozzles 25, and so located that the recesses 13 of the mold bars 11 will engage said guide rods 27. The rods 27 extend some distance beyond the ends of the nozzles 25, for a purpose which will be readily apparent.

The operation of the apparatus hereinbefore described, as well as the method employed in connection therewith, may now be explained. It should, of course, be understood that a plurality of the mold structures shown in Figs. 3 and 4 of the drawings are provided, the number depending upon the output of the plant wherein the process and apparatus are used.

One of the mold structures is taken and the closure plate 15 brought against one of the side bars 11 of the mold structure, with the rubber facing 16 between the bar 15 and the bar 11. The clamps 17 are now brought into position and the closure bar 15 thereby secured in place, thus closing one end of each of the mold tubes 10.

The mold structure is now placed in front of the nozzles 25 which project from the manifold 22, the recesses 13 of the mold bars 14 engaging the guide rods 27 at the outer ends thereof. The mold structure is now pushed inward, being guided by the rods 27 so that each of the mold tubes 10 is slid over the corresponding nozzle 25 of the manifold 22.

The stop cock 24 is now operated, permitting a quantity of the meat under pressure to flow through the pipe 23 from the cylinder of the sausage stuffer (not shown). As the meat is thus forced into the manifold 22, the meat which was previously in the manifold and nozzles will be fed outward through the nozzles 25 into the mold tubes 10, thus filling the mold tubes with the sausage meat in a closely compacted condition. As the sausage meat is fed into the mold tubes through the nozzles 25, the mold structure is retracted, either by permitting the same to be pushed forward by the meat fed therein, or by a positive manipulation of the mold structure.

At the proper time, as the inner ends of the mold tubes approach the end of the nozzles 25, the stop cock 24 is again operated to shut off the supply of sausage meat to the manifold, this action being so timed as to stop the flow of the sausage meat when each of the mold tubes is filled.

In this manner, each of the molds will be properly and expeditiously filled with the sausage meat, without voids caused by entrapped air within the molds. It will be understood that the degree of compactness of the meat in the molds may be varied by varying the pressure under which the sausage meat is extruded from the nozzles 25, as well as by varying the speed of retraction of the mold structure with respect to the rate of feed of the sausage meat.

After the mold structure is filled with the sausage meat as above described, the same may be removed from the filling apparatus. The closure bar 15, with its rubber facing 16, may now be removed from the mold structure by releasing the clamps 17, after which the subsequent processing of the sausage meat contained within the molds may be effected.

It will be understood that various modifications may be made in the apparatus without departing from the spirit of my invention, as the same may, if desired, be readily embodied in a machine in which certain of the manipulations are performed automatically.

Having thus described the nature and characteristic features of my invention, what I claim as new and desire to secure by Letters Patent, is:

1. In a method of filling a mold structure having a plurality of open ended hollow spaces formed therein, the steps which comprise closing said hollow spaces at one end, bringing said mold structure into operative relationship with a plurality of nozzles having portions fitting said hollow spaces whereby a nozzle will extend into each of said hollow spaces with the end of the nozzle in proximity to the closed ends of said hollow spaces, and then supplying the substance to be filled from a single source into said mold under sufficient pressure through said nozzles to cause the substance to be compacted in the mold structure.

2. In a method of forming sausages in a mold structure having a plurality of open ended chambers arranged in spaced substantially parallel relationship, the steps of closing said chambers at one end, bringing said mold structure into operative relationship with a plurality of nozzles whereby a nozzle will extend into each of said chambers with the end of the nozzle in proximity to the closed end of a chamber, supplying sausage meat simultaneously through the nozzles from a single source under pressure, and causing the retraction of the mold structure from the nozzles by the pressure of the sausage meat as it is fed to the interior of the chambers.

3. In a method of forming sausages in a mold structure having a plurality of open ended chambers arranged in spaced substantially parallel relationship, the steps of closing said chambers at one end, bringing said mold structure into operative relationship with a plurality of nozzles whereby a nozzle will extend into each of said chambers with the end of the nozzle in proximity to the closed end of a chamber, supplying sausage meat to said nozzles from a single source under pressure, and forcing the mold structure from the nozzles by meat pressure as the sausage meat is fed to the interior of the chambers, and shutting off the supply of sausage meat as the ends of the nozzles approach the open ends of the chambers.

4. Apparatus for forming sausages comprising a mold structure provided with a plurality of open ended chambers arranged in spaced substantially parallel relationship, means for closing one end of each of said chambers, a manifold adapted to be connected to a supply of sausage meat, and a plurality of nozzles fitting said chambers and projecting from said manifold, said nozzles being arranged in spaced parallel relationship complemental to said chambers.

5. Apparatus for forming sausages comprising a mold structure provided with a plurality of open ended chambers arranged in spaced substantially parallel relationship, means for closing one end of each of said chambers, a manifold adapted to be connected to a supply of sausage meat under pressure, a plurality of nozzles fitting said chambers and projecting from said manifold, said nozzles being arranged in spaced parallel relationship complemental to the mold chambers, and means for controlling the flow of sausage meat.

6. Apparatus for forming substances comprising a bodily movable mold structure provided with a plurality of chambers arranged in spaced substantially parallel relationship, a manifold adapted to be connected to a supply under pressure of the substance to be formed, a plurality of fixed nozzles fitting said chambers and projecting from said manifold, said nozzles being arranged in spaced substantially parallel relationship complemental to the mold chambers, means for controlling the flow of substance through said nozzles, and means for guiding said mold structure in its movement with respect to said nozzles.

7. Apparatus for forming sausages comprising a mold structure provided with a plurality of open ended tubes arranged in spaced parallel relationship, means for closing one end of each of said tubes, a manifold adapted to be connected to a supply of sausage meat, a plurality of nozzles projecting from said manifold, said nozzles being arranged in spaced parallel relationship complemental to the mold tubes, means for controlling the flow of sausage meat, guide bars extending from the manifold, and the mold structure having recesses adapted to engage said guide bars whereby the mold tubes will be properly positioned with respect to the nozzles.

8. A mold for forming sausages comprising a plurality of open ended tubes arranged in spaced parallel relationship, bars in which the ends of said tubes are secured, a closure plate extending across the open ends of all of said tubes and adapted to be mounted on one of said bars to close the tubes at one end, and clamps for securing said closure plate to the mold structure.

9. A mold for forming sausages comprising a plurality of open ended tubes arranged in spaced parallel relationship, bars in which the ends of said tubes are secured, said bars having ends projecting beyond the group of mold tubes, the projecting ends of said bars having recesses for positioning the mold structure with respect to a filling device, a closure plate adapted to be mounted on one of said bars to close the tubes at one end, and clamps for securing said closure plate to the mold structure.

10. A mold for forming sausages comprising a plurality of open ended tubes arranged in spaced parallel relationship, bars in which the ends of said tubes are secured, said bars having ends projecting beyond the group of mold tubes, handles in the form of tubes extending parallel to said first named tubes and mounted in said projecting ends, a closure plate adapted to be mounted on one of said bars to close the tubes at one end, and clamps for securing said closure plate to the mold structure.

11. A mold for forming sausage comprising a plurality of open ended tubes arranged in spaced parallel relationship, bars in which the ends of said tubes are secured, said bars having ends projecting beyond the group of mold tubes, handles paralleling said tubes mounted in said projecting ends, the projecting ends of said bars having recesses for positioning the mold structure with respect to a filling device, a closure plate adapted to be mounted on one of said bars to close the tubes at one end, and clamps for securing said closure plate to the mold structure.

CHARLES H. VOGT.